March 15, 1927.  1,620,832
F. R. PORTER
INTERNAL COMBUSTION ENGINE
Filed May 28, 1924   5 Sheets-Sheet 3
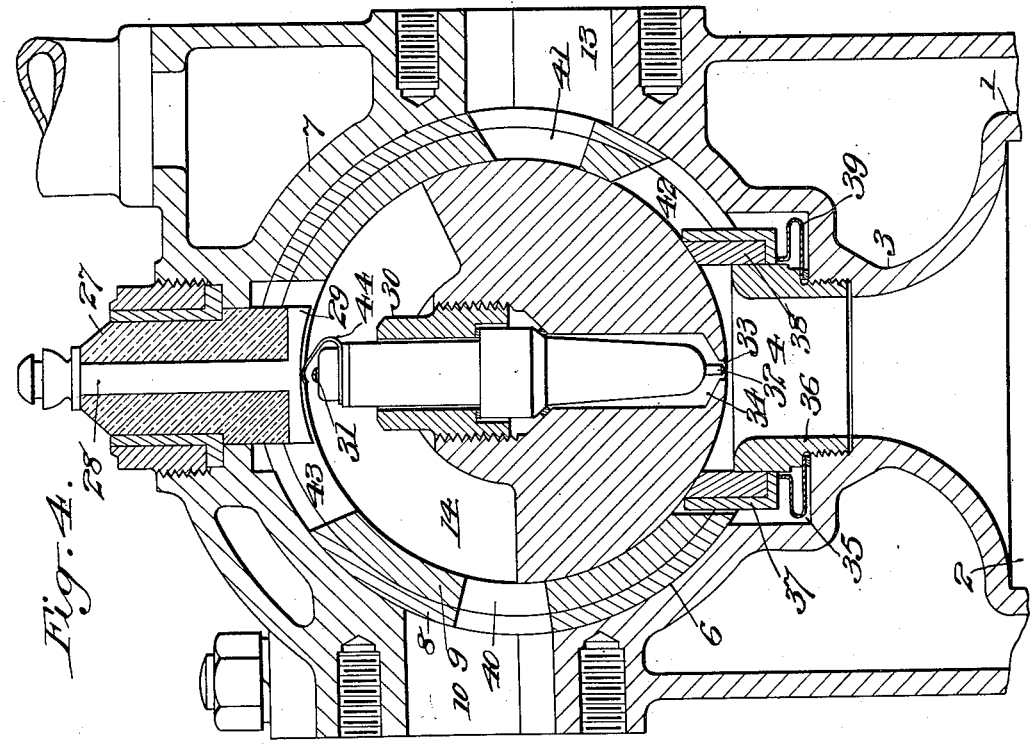
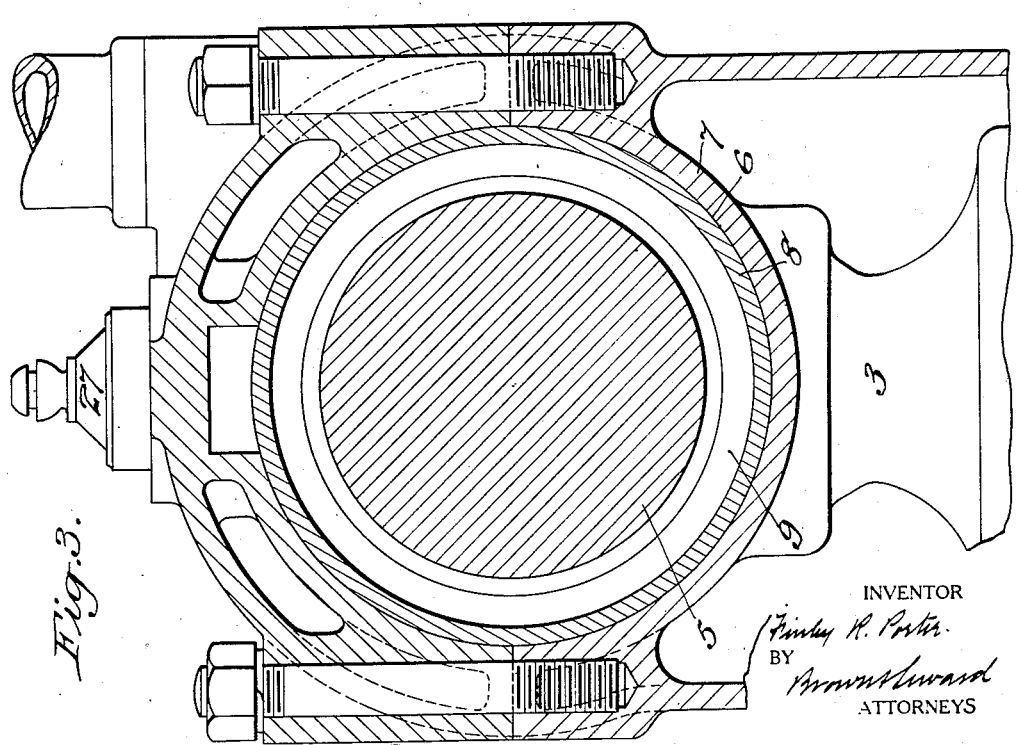
INVENTOR
BY
ATTORNEYS

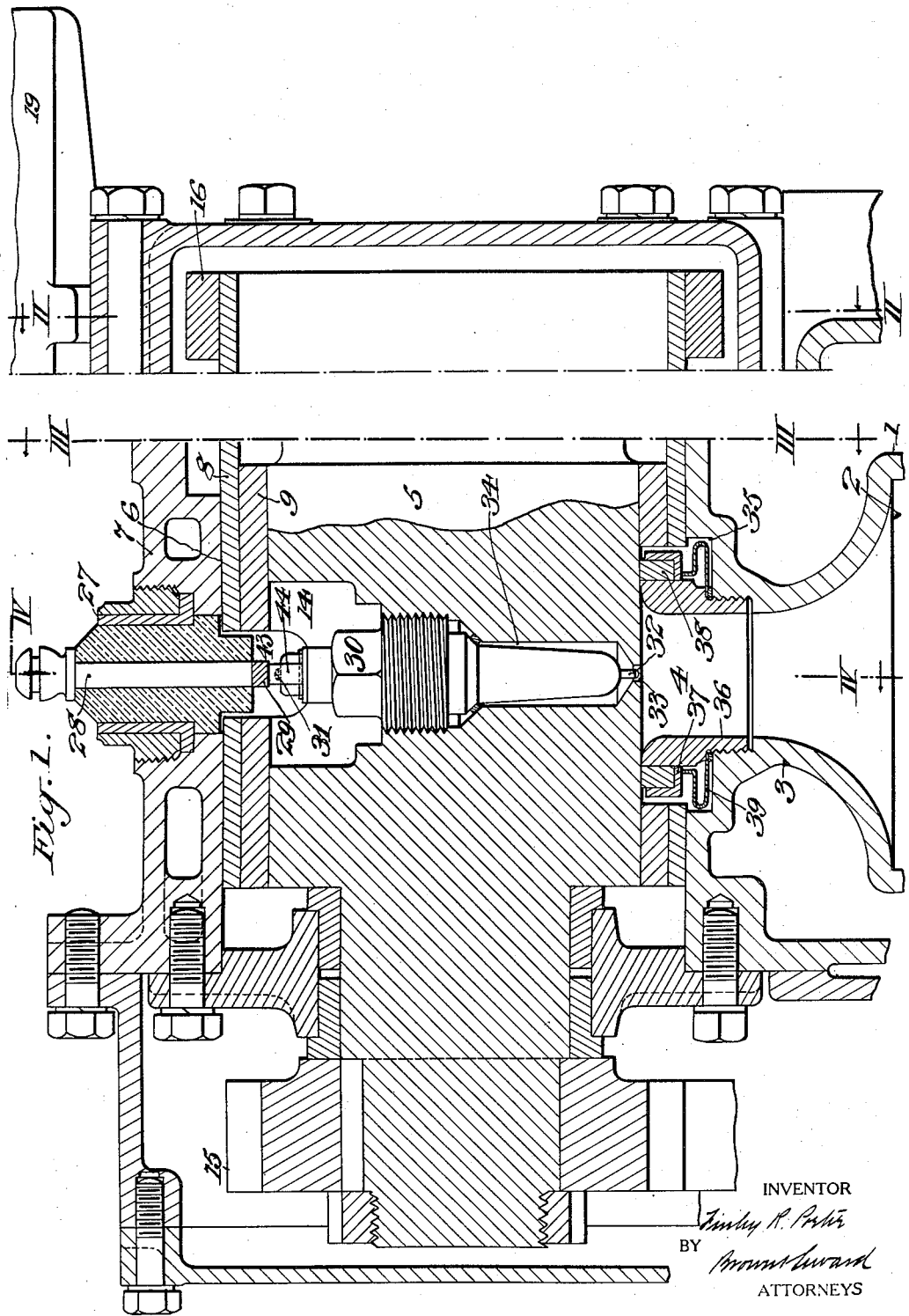

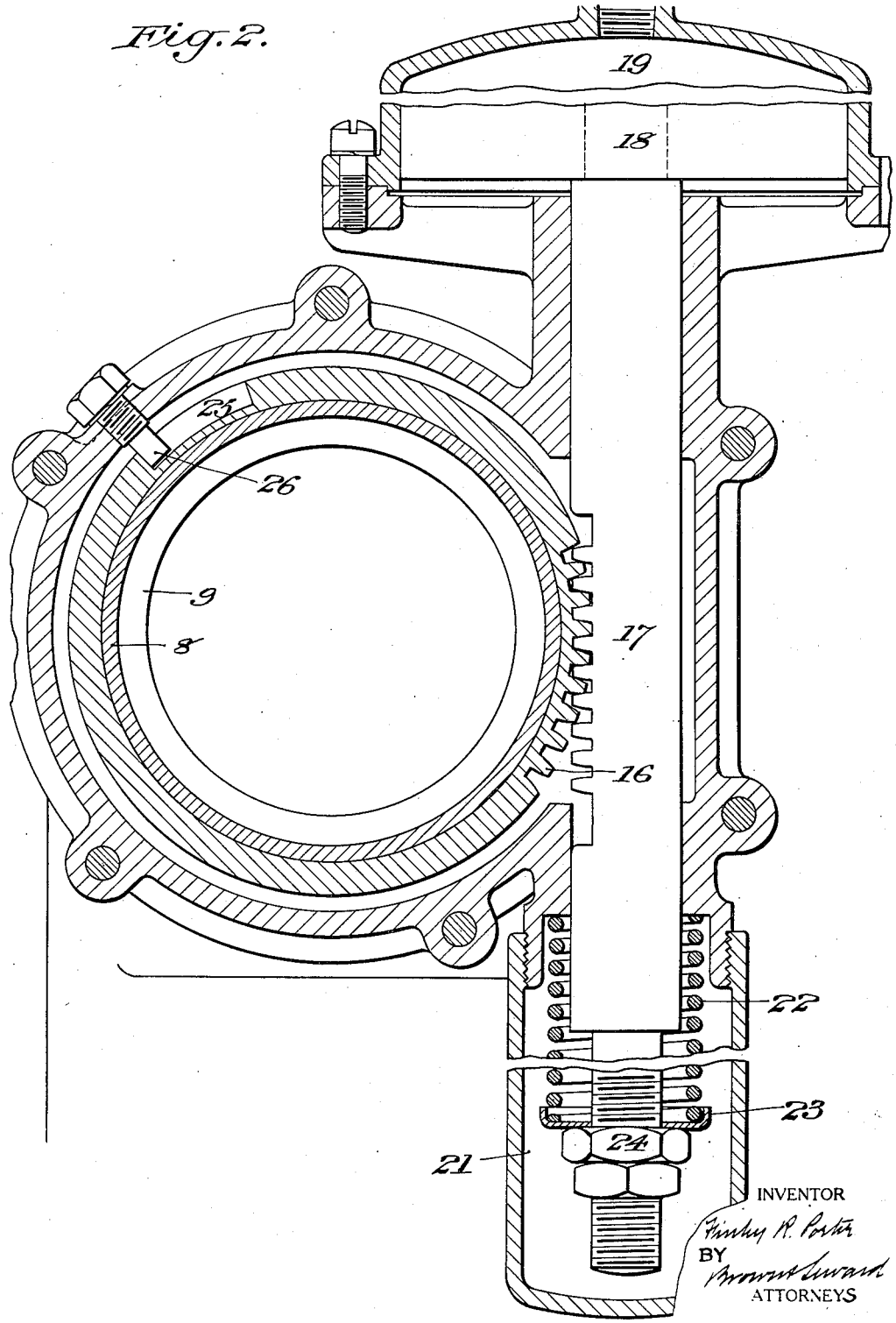

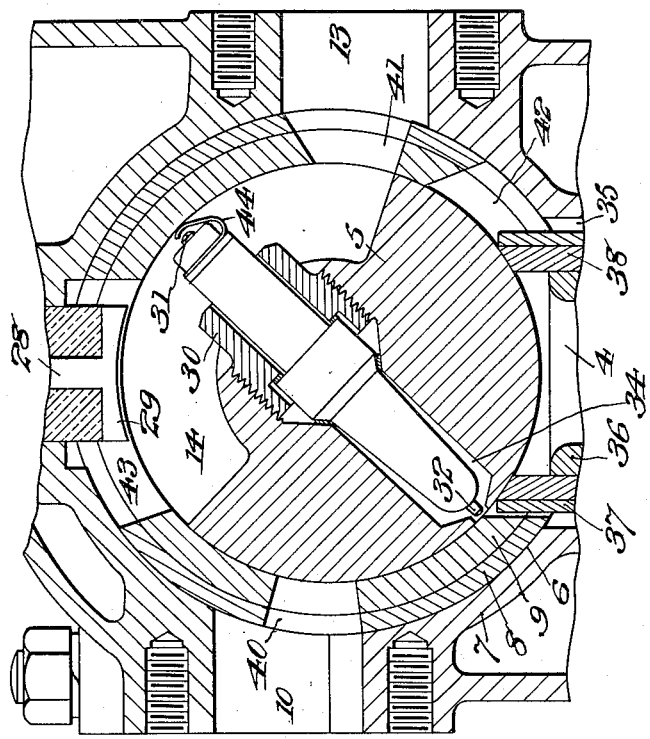
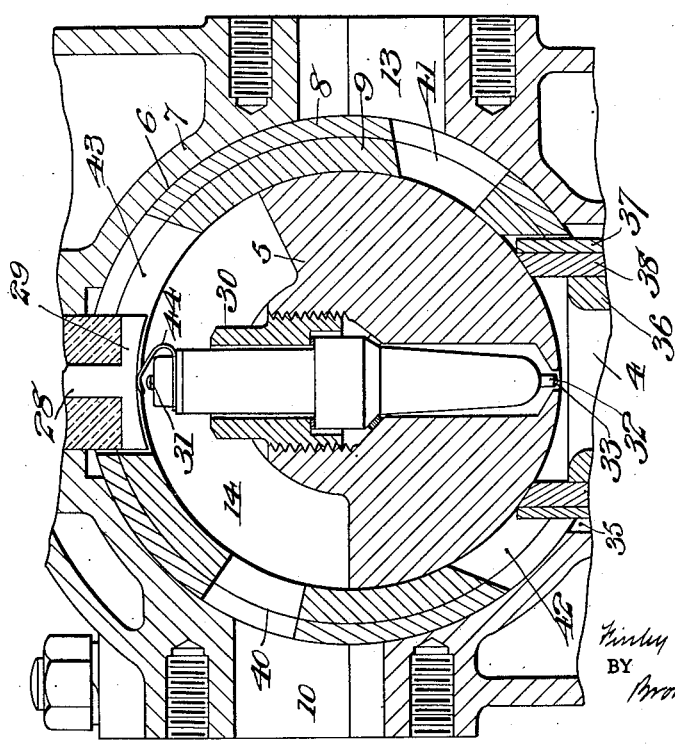

March 15, 1927.
F. R. PORTER
1,620,832
INTERNAL COMBUSTION ENGINE
Filed May 28, 1924
5 Sheets-Sheet 5
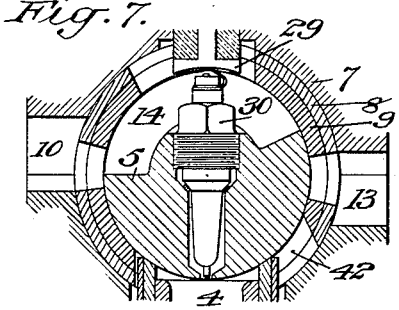
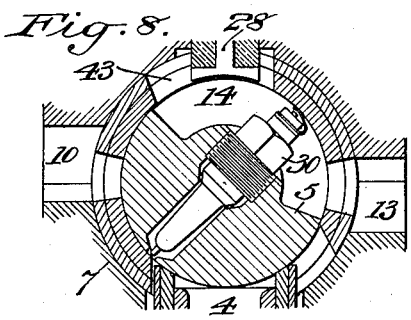
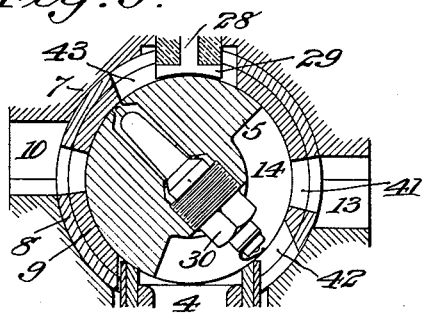
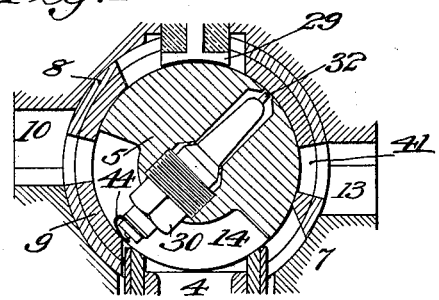
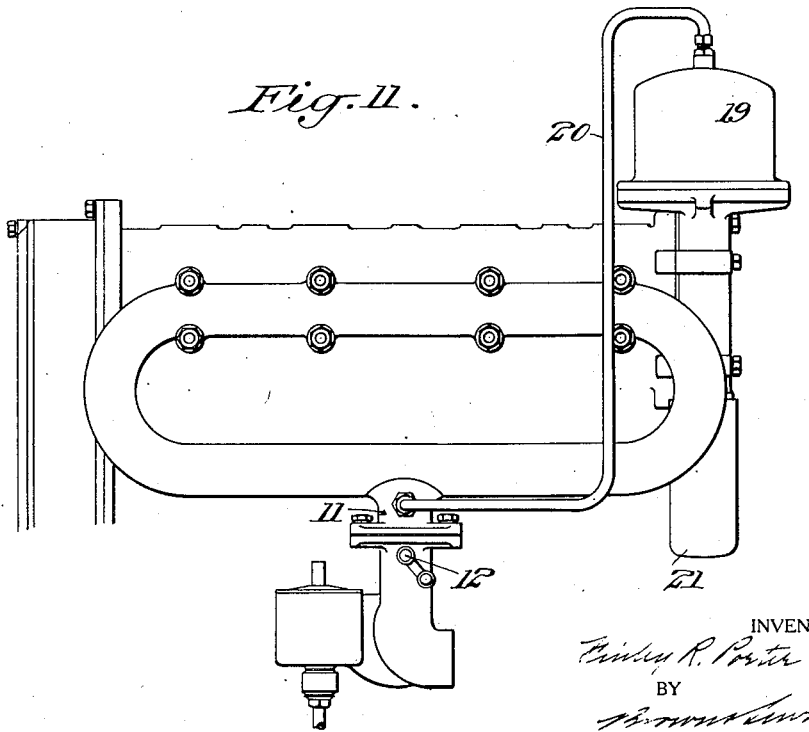
INVENTOR
Finley R. Porter
BY
ATTORNEYS Patented Mar. 15, 1927.

1,620,832

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed May 28, 1924. Serial No. 716,386.

Internal combustion engines of the variable speed type such, for instance, as automobile engines are designed and rated with respect to the results obtained under wide open or non-throttled conditions of the fuel gas intake where the compression ratio and thermal efficiency are fully realized.

It is well known that under throttled conditions of the fuel gas intake, the pressure and thermal efficiency are reduced in more than a direct ratio.

The object of this invention is to maintain the compression ratio and thermal efficiency constant and at a maximum, under throttled conditions of the fuel gas intake, regardless of the amount of power output required.

With this object in view, this invention comprises means whereby the opening of the fuel gas inlet port and the closing of the combusted gas exhaust port may be varied under different throttle conditions in the fuel gas intake, and means whereby the spark plug may be located in the rotary valve and the spark advanced and retarded, as found necessary.

This invention more particularly comprises an internal combustion engine of the rotary valve type, in which each cylinder has a common inlet and exhaust port, a valve chest having inlet and exhaust ports, a rotary valve for opening and closing said ports, and a valve bearing sleeve having ports open to said cylinder, inlet and exhaust ports, which bearing sleeve may be rotatively adjusted as the throttle conditions in the fuel gas intake are varied, as, for instance, by placing the bearing sleeve under the control of the variations in pressure in the fuel gas intake due to the more or less opening of the throttle valve.

My invention also comprises certain improvements in the construction, form and arrangement of the several parts of the engine as will be hereinafter fully pointed out and claimed.

A practical embodiment of this invention is represented in the accompanying drawings, in which—

Fig. 1 is a detail vertical longitudinal central section through the engine.

Fig. 2 is a detail cross section taken in the plane of the line II—II of Fig. 1.

Fig. 3 is a detail cross section taken in the plane of the line III—III of Fig. 1.

Fig. 4 is a cross section taken in the plane of the line IV—IV of Fig. 1.

Fig. 5 is a detail section similar to Fig. 4 with the rotary valve in another position.

Fig. 6 is a detail section similar to Fig. 4 with the valve bearing sleeve moved to another position.

Figs. 7, 8, 9 and 10 are diagrammatic views, representing the rotary valve in four different positions, in its rotary movement.

Fig. 11 is a diagrammatic view, representing the means for placing the rotatively adjustable bearing sleeve under the control of the fuel gas intake.

The engine may be composed of as many cylinders as desired. One cylinder and its valve and adjacent parts will now be described.

The cylinder is denoted by 1 and its chamber by 2. The outer end of the cylinder 1 is provided with a reduced neck 3, forming an axially arranged passage having a common inlet and outlet port 4 open to the face of the rotary valve 5, disposed transversely to the cylinder in the circular bore 6 of a valve chest 7. A rotatively adjustable valve bearing sleeve 8 is provided with a lining 9 of oil impregnated self lubricating material such as an oil absorbing metal, and it is located between the face of the valve 5 and the walls of the bore 6 so that the valve needs no additional supply of oil to lubricate it.

The valve chest 7 is provided with the inlet port 10 and exhaust port 13, which inlet port 10 is in open communication with the fuel gas intake 11, in which intake there is located the usual throttle valve 12. The inlet port 10 and exhaust port 13 are both open through the bearing sleeve 8 and lining 9 to the face of the rotary valve 5 in the same plane as the common cylinder port 4. In the present arrangement the inlet and exhaust ports 12 and 13 are shown as located diametrically opposite each other and the cylinder port 4 located half-way between them.

The rotary valve 5 has a peripheral bridge port 14 located in the same plane as the inlet, exhaust and cylinder ports, which valve port is of sufficient length to open communication between the inlet port 12 and cylinder port 4, when the valve is in one position and to open communication between the cylinder port 4 and the exhaust port 13, when the valve is in another position of its rotary movement.

It will be understood that the valve bearing sleeve 8 and the rotary valve 5 extend the full length of the motor, while the sleeve linings 9 are approximately of a length equal to the outside diameter of their cylinders and centrally located over the cylinders, the length of these linings being determined by the amount of bearing surface required for the rotary valve. The rotary valve, at one end, is provided with the usual gear 15, by means of which the valve may be rotated in the usual manner, by means not shown herein.

The bearing sleeve 8 is provided, at the opposite end, with a ring 16 having a series of teeth cut therein, which mesh with the teeth of a rack 17, the upper end of which rack is provided with a piston 18, fitted to slide in a chamber 19 in open communication through a pipe line 20, with the fuel gas intake 11 above the throttle valve 12. The opposite end of the rack 17 projects into a chamber 21. A coil spring 22 is interposed between one end of the chamber and the washer 23, adjustably positioned on the rack by the nut 24 for normally holding the rack at the limit of its movement, on one direction. The rotative movement of the valve bearing sleeve 8 is limited in both directions by a pin and slot device 25, 26, the pin being carried by the engine casing and the slot being located in the periphery of the sleeve ring 16.

A terminal plug 27 carried by the valve chest 7 has its conductor 28 located in the secondary circuit of any well known or approved ignition circuit. The inner end 29 of the conductor 28 is located in close proximity to the face of the rotary valve 5.

A spark plug 30 is located in the rotary valve, with its center electrode 31 in the same transverse plane as the cylinder port 4, bridge port 14 and terminal plug conductor 28. The sparking end 32 of this spark plug is located in a peripheral opening 33 of the recess 34, in which the spark plug is located, so that, at the proper time, the fuel gas is ignited at the cylinder port 4. The opposite end of this electrode 31 is provided with a spring contact piece 44, arranged in the rotation of the valve to wipe the face of the inner end 29 of the terminal plug 28, which inner end 29 is circumferentially elongated to provide for the required advancing or retarding of the spark within certain limits.

An annular packing chamber 35 is formed exterior to a ring 36, screwed into the neck 3 of the cylinder, the bore of which ring forms the mouth of the cylinder port 4. The packing ring herein shown as comprising a shell 37 and an insert 38 of oil impregnating self lubricating hard material, preferably metal, is located in the packing chamber 35. A resilient means such, for instance, as a diaphragm 39 is provided for holding the oil impregnated self lubricating insert 38 in engagement with the face of the valve. A gas tight joint is thus provided around the cylinder chamber port 4.

The valve bearing sleeve 8 and its lining 9 are provided with ports 40, 41 and 42 therethrough, opening to the inlet port 10, the exhaust port 13 and the cylinder port 4 respectively, the port 42 being sufficiently large to receive the packing ring 37, 38 and permit it to engage the face of the rotary valve 5. The sleeve 8 and lining 9 also have an opening 43 therethrough, to receive the inner end of the terminal plug 27.

Any suitable oil impregnated self lubricating material may be used for the bearing sleeve lining 9 and the packing ring insert 38, such, for instance, as "Genalite" made by the General Electric Company of Schenectady, New York, Genalite being a molded porous material comprising synthetic bronze and graphite so combined that the material will absorb by capillary attraction from 2% to 3% by weight, of lubricating oil.

In operation:

When starting the engine with the throttle valve nearly closed, a partial vacuum will be created in the upper portion of the rack piston chamber 19 which will draw the piston 18 and rack upward against the tension of the spring 22 until the stop pin 25 comes in contact with one end of the slot 26, thus bringing the ports 40, 41 and 42 in the sleeve lining, to the positions shown in Fig. 6. This movement will approximate twenty-five degrees in relation to the valve travel and approximately fifty degrees in relation to the crank shaft travel. The effect will be that the closing of the exhaust port will not take place until the engine piston has traveled downward fifty degrees from top center, which, in turn, means that a considerable amount of combusted gases will be pulled back into the cylinder chamber. Immediately thereafter the exhaust port will be closed and the inlet port opened, causing the balance of the cylinder chamber to be filled with the fuel gas. As the throttle valve is opened, the partial vacuum in the rack piston chamber 19 will decrease and the spring 22 will begin to pull the rack upwardly which, in turn, will rotate the sleeve and lining to change the time of the inlet opening and exhaust closing in proportion to the amount of the throttle opening, such change fluctuating back and forth in a direct ratio to the amount of throttle valve opening at all times.

Inasmuch as the exhaust port opening is determined by the relative position of the leading edge of the bridge port 14 in the rotary valve 5 and the bearing ring 37, 38; and that the inlet port closing is determined by the position of the trailing edge of the said bridge port and the bearing ring, these two functions remain constant.

It will thus be seen that, under reduced throttle conditions a great portion of the cylinder chamber will be filled with inert combusted gases and a minor portion of the cylinder chamber will be filled with fuel gas. It is very desirable that these combusted gases and fuel gas be kept separate so that the fuel gas can be ignited readily, especially under slow engine speeds. Consequently, by placing the spark plug in the rotating valve, the spark will be produced at the mouth of the cylinder chamber port which is filled with the fuel gas, which was last introduced into the cylinder chamber where it is unaffected by the turbulence due to the action of the engine piston, and will be readily ignited.

It is evident that various changes may be resorted to in the construction, form and arrangement of the several parts without departing from the spirit and scope of my invention; hence, I do not wish to limit myself to the particular embodiment herein shown and described, but—

What I claim is:—

1. In an internal combustion engine, a cylinder port, a valve chest having inlet and exhaust ports, a valve for opening and closing said ports, and means to change the time of said inlet opening and exhaust closing, said means being controlled by varying throttle conditions.

2. In an internal combustion engine, a cylinder port, a valve chest having inlet and exhaust ports, a valve for opening and closing said ports, and means to change the time of said inlet opening and exhaust closing, said means being controlled by variations in pressure in the engine intake due to varying throttle conditions.

3. In an internal combustion engine of the rotary valve type, a cylinder port, a valve chest having inlet and exhaust ports, a rotary valve for opening and closing said ports, and means to change the time of said inlet opening and exhaust closing, said means being controlled by varying throttle conditions.

4. In an internal combustion engine of the rotary valve type, a cylinder port, a valve chest having inlet and exhaust ports, a rotary valve for opening and closing said ports, and means to change the time of said inlet opening and exhaust closing, said means being controlled by variations in pressure in the engine intake due to varying throttle conditions.

5. In an internal combustion engine of the rotary valve type, a cylinder port, a valve chest having inlet and exhaust ports, a rotary valve for opening and closing said ports, and a valve bearing sleeve having ports open to said cylinder, inlet and exhaust ports, said sleeve being rotatively adjustable to change the time of the inlet opening and exhaust closing.

6. In an internal combustion engine of the rotary valve type, a cylinder port, a valve chest having inlet and exhaust ports, a rotary valve for opening and closing said ports, and a valve bearing sleeve having ports open to said cylinder, inlet and exhaust ports, said sleeve being rotatively adjustable by varying throttle conditions to change the time of said inlet opening and exhaust closing.

7. In an internal combustion engine of the rotary valve type, a cylinder port, a valve chest having inlet and exhaust ports, a rotary valve for opening and closing said ports, and a valve bearing sleeve having ports open to said cylinder, inlet and exhaust ports, said sleeve being rotatively adjustable by the variations in pressure in the engine intake due to varying throttle conditions, to change the time of said inlet opening and exhaust closing.

8. In an internal combustion engine, a valve chest having inlet and exhaust ports, a valve for opening and closing said ports, and means for changing the timing of the inlet port opening and the exhaust port closing without changing the relationship of the inlet port closing with respect to the exhaust port opening, said means being controlled by varying throttle conditions.

9. In an internal combustion engine, a valve chest having inlet and exhaust ports, a valve for opening and closing said ports, and means for changing the timing of the inlet port opening and the exhaust port closing without changing the relationship of the inlet port closing with respect to the exhaust port opening, said means being controlled by variations in pressure in the engine intake due to varying throttle conditions.

10. In an internal combustion engine of the rotary valve type, a valve chest having inlet and exhaust ports, a rotary valve for opening and closing said ports, and means for changing the timing of the inlet port opening and the exhaust port closing without changing the relationship of the inlet port closing with respect to the exhaust port opening, said means being controlled by varying throttle conditions.

11. In an internal combustion engine of the rotary valve type, a valve chest having inlet and exhaust ports, a rotary valve for opening and closing said ports, and means for changing the timing of the inlet port opening and the exhaust port closing without changing the relationship of the inlet port closing with respect to the exhaust port opening, said means being controlled by variations in pressure in the engine intake due to varying throttle conditions.

12. In an internal combustion engine of the rotary valve type, a cylinder port, a valve chest having inlet and exhaust ports, a rotary valve for opening and closing said ports, and a valve bearing sleeve having ports open to said cylinder, inlet and exhaust ports, said sleeve being rotatively adjustable by varying throttle conditions to change the timing of the inlet port opening and the exhaust port closing without changing the relationship of the inlet port closing with respect to the exhaust port opening.

13. In an internal combustion engine of the rotary valve type, a cylinder port, a valve chest having inlet and exhaust ports, a rotary valve for opening and closing said ports, and a valve bearing sleeve having ports open to said cylinder, inlet and exhaust ports, said sleeve being rotatively adjustable by variations in pressure in the engine intake due to varying throttle conditions to change the timing of the inlet port opening and the exhaust port closing without changing the relationship of the inlet port closing with respect to the exhaust port opening.

14. In an internal combustion engine of the rotary valve type, a cylinder port, a valve chest having inlet and exhaust ports, a rotary valve for opening and closing said ports, a valve bearing sleeve having ports open to said cylinder, inlet and exhaust ports, and means for rotatively adjusting said sleeve comprising, a piston carrying rack meshing with said sleeve, a piston chamber open to the engine intake, tending to pull the rack in one direction, means tending to pull the rack in the other direction, and means for limiting the rotative movement of said sleeve.

15. In an internal combustion engine of the rotary valve type, a cylinder port, a valve chest having inlet and exhaust ports, a rotary valve for opening and closing said ports, a valve bearing sleeve having ports open to said cylinder, inlet and exhaust ports, and means for rotatively adjusting said sleeve comprising, a sleeve ring having a series of teeth, a piston carrying rack meshing with said teeth, a piston chamber open to the engine intake, tending to pull the rack in one direction, means tending to pull the rack in the other direction, and means for limiting the rotative movement of said sleeve.

In testimony, that I claim the foregoing as my invention, I have signed my name this 23rd day of May, 1924.

FINLEY R. PORTER.